3,228,441
STRESS PLANE CUTTER
Oswald Erich Eissmann, Richmond, Va., assignor to American Machine & Foundry Company, a corporation of New Jersey
Filed Feb. 23, 1962, Ser. No. 176,861
13 Claims. (Cl. 146—117)

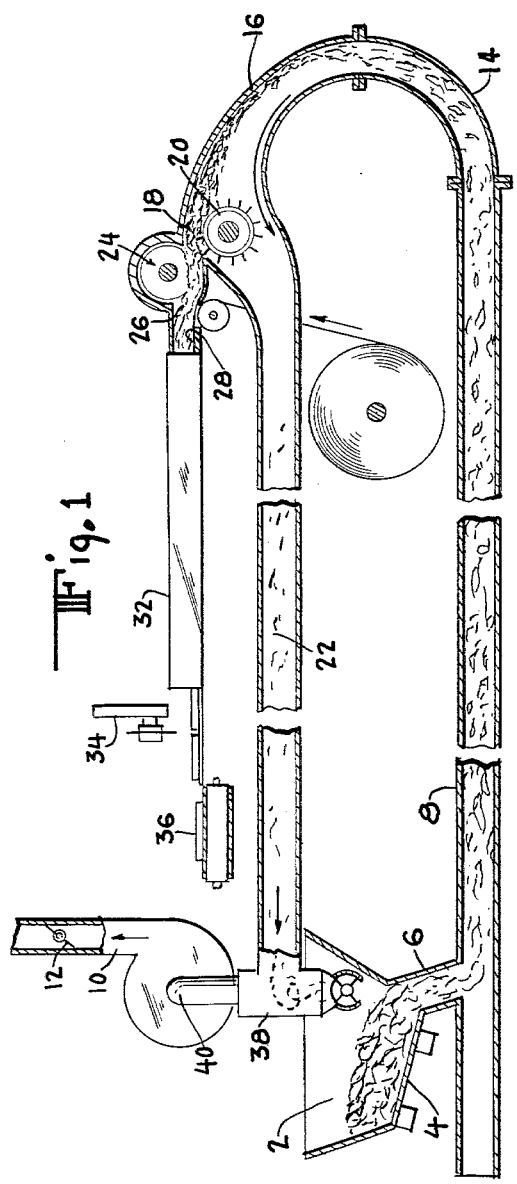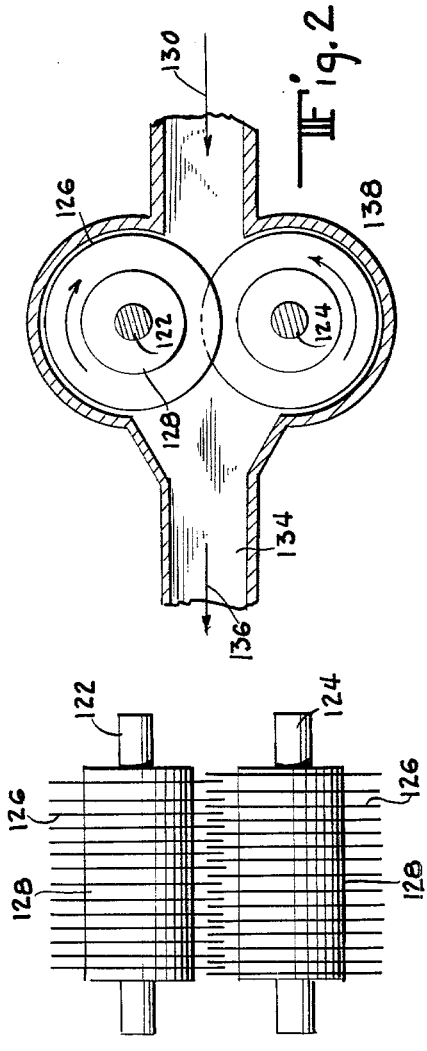

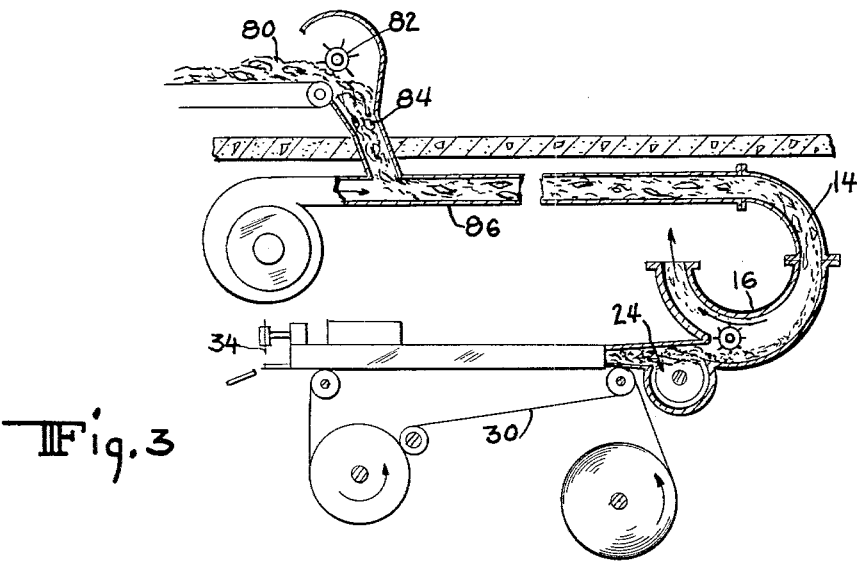
Fig. 3
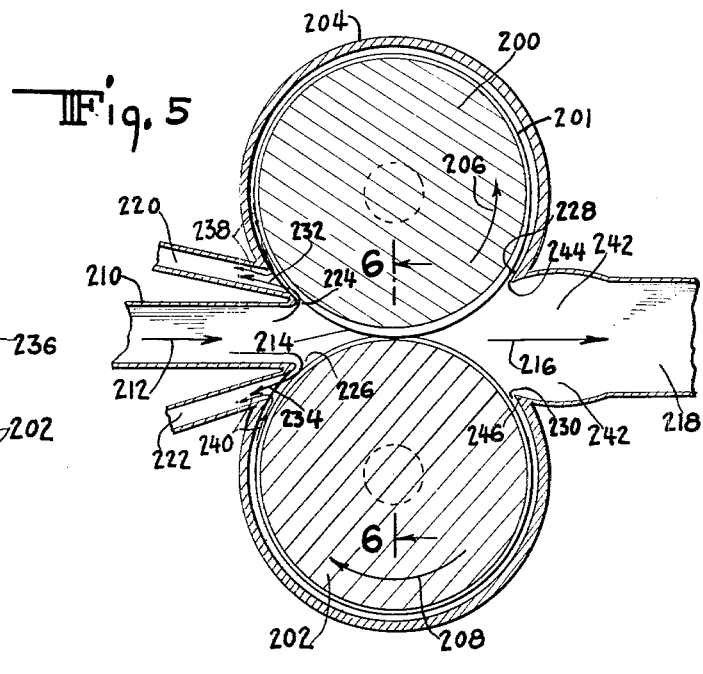
Fig. 5
Fig. 6
INVENTOR.
Oswald Erich Eissmann
BY Tenner J. Erstad
ATTORNEY Jan. 11, 1966     O. E. EISSMANN     3,228,441
STRESS PLANE CUTTER
Filed Feb. 23, 1962     3 Sheets-Sheet 3
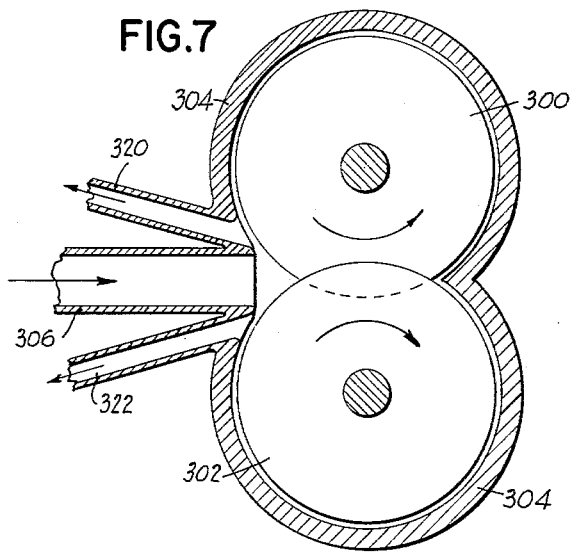
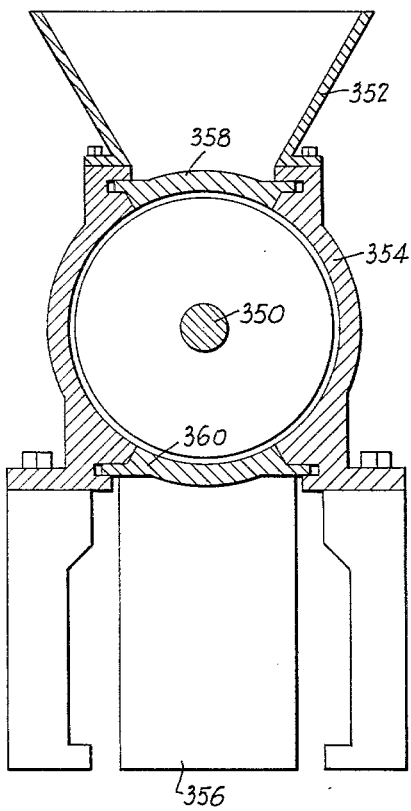
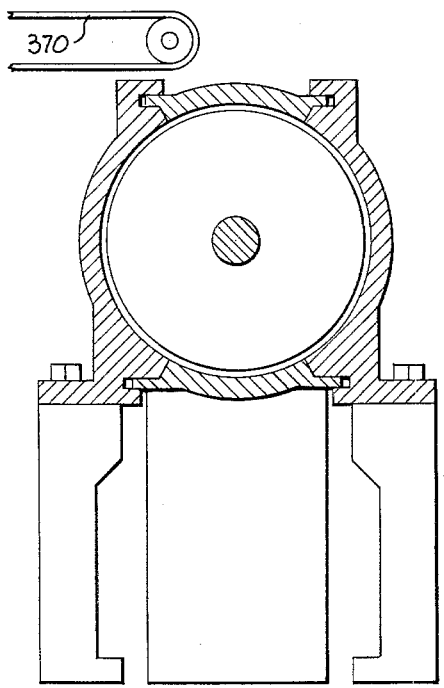
INVENTOR
OSWALD ERICH EISSMANN
BY George L Hastings
ATTORNEY

United States Patent Office 3,228,441
Patented Jan. 11, 1966

This application is a continuation-in-part of my application, Serial No. 780,725, filed December 16, 1958, now abandoned, which, in turn, is a continuation-in-part of my application, Serial No. 681,280, filed August 30, 1957, now Patent 3,026,878, granted March 27, 1962, and claim is made to all of the equitable and legal benefits derivable therefrom.

This invention is an improved method of and apparatus for manufacturing cigarettes.

In another aspect this invention is an improved method of and apparatus for pulverizing materials.

The invention features a high speed rotor having multiple continuous circular projections constituting gang cutters operating on what is called the stress plane principle.

In stress plane cutting a circular cutting edge is rotated at sufficient speed to produce a layer of air or gas between the cutting edge and the material which is to be severed. The layer exerts tremendous pressure on the material. It is theorized that the great pressure in turn creates what is called a stress plane in the material which severs the material without direct engagement between the cutting element and the material.

In this application where the term cutters, cutting element, or the like, is used, what is meant is the moving element or elements which produce the stress plane, rather than a layer of air or gas under pressure created by the moving element, or the stress plane per se created by the pressure. And when the term material is employed, it is to be understood that what is meant is tobacco, or any other material, susceptible to reduction in size by successive division to any desired fineness.

An object of the invention is the improvement in the mechanism for and method of manufacturing cigarettes.

Another object of the invention is to provide a cutting means which will sever tobacco without direct engagement between the cutting element and the material.

Another object of the invention is to provide a cigarette machine which includes a stress plane cutter, to which tobacco is conveyed pneumatically and which includes means for diverting air away from the cutters to prevent turbulence.

The invention, in another of its aspects, is a high speed shredding mechanism for shredding tobacco for use in cigarettes.

Another object of the invention is a simplified method and apparatus for shredding tobacco for use in cigarettes which afford higher production speeds and a more uniform product than heretofore obtainable.

Another object of the invention is to provide a discharge means for a stress plane cutter which automatically removes severed material from the cutting element.

Another object of the invention is the elimination of four operations which are required to be performed in manufacturing cigarettes by the process currently most widely employed in the industry.

Another object of the invention is the elimination of two operations which are necessary for the maintenance of the cigarette manufacturing machine which is employed in that process.

The four operations which are presently required in the preparation of tobacco for use in cigarettes, which four operations are eliminated by the present invention, are as follows:

(1) Adjusting the moisture content of the tobacco prior to compressing it into a cake for shredding the tobacco for use in cigarettes, to minimize breakage during compacting and to thereby promote the formation of long shreds.

(2) Compressing the tobacco prior to shredding, to form a cake which is employed in shredding.

(3) Separating the matted tobacco produced in the current process as a result of shredding the tobacco cake.

(4) Partly drying the dematted tobacco to promote further separation of the shreds.

The two machine maintenance operations which are eliminated by the present invention are as follows:

(1) Resharpening the tobacco cutting tool.

(2) Removing the emanations, such as juices, gums and resins, resulting from the tobacco cutting process, from the cutting tool, and the machine parts adjacent thereto, on which they harden into a tenacious coating.

Another object of the invention is the improvement of the mechanism and the method of pulverizing any susceptible material without limit.

A feature of the invention is a cutting mechanism comprising a pair of generally opposed rotors formed in each of which are a large number of discs, fifty or more, for instance, all integral with their individual rotors. The two rotors are spaced so that the discs on one intermesh slightly with the discs on the other. By this is meant that the peripheries of the discs on one rotor at the position where they most closely engage the peripheries of the discs of the other rotor overlap by a few thousandths of an inch. The rotors are operated at speeds sufficiently high to exert sufficient pressure on a layer of air or gas therebetween to produce a stress plane in material fed between the rotors so as to sever material without contact between it and the discs.

The theory of operation of the cutting element employed in the present invention is perhaps not completely understood. It is believed, however, that when the rotors are operated at sufficiently high speed, that is so that their peripheries revolve at more than about 325 linear feet per second, and preferably at about 500 feet to 700 feet per second, a layer of gas or air under pressure is produced between the peripheries of the discs and the tobacco or other material on which they operate. The pressures which are produced are dependent upon the rate of revolution of the discs and are enormous, several thousand tons per square inch. It is believed that the stress plane results from the enormous pressure. It is thought that the rate of propagation of the stress through the material bears some relation to the speed of sound through the material. It is known that the necessary speed of operation varies for different materials and is related inversely to the speed of sound in the material.

A phenomenon generally mentioned as present in cutters operating at sufficiently high speeds to produce a stress plane in the severed material is that there is no actual contact between the rotating discs and the material. Probably largely, if not entirely, as a result of this, it has been found that there are no emanations from the tobacco as a result of the cutting. Therefore, there is no deposit of such material and no drying or caking on the cutting elements, or on the machine parts adjacent thereto. This has afforded two unexpected advantages in the use of such cutters in a cigarette manufacturing machine.

(1) The cutters are never required to be resharpened by consequence of their being dulled in cutting the tobacco, and except for malfunction, due for instance to an infrequent encounter between the cutters and foreign material, the cutters will operate indefinitely without requiring resharpening, thus eliminating a besetting difficulty resulting in expense and machine shutdown in following current tobacco cutting practice. (In one large cigarette manufacturing plant, in which one million pounds of tobacco are cut per day, the normal period of operation of the cutter was heretofore limited to fifteen minutes before the cutter required resharpening.)

(2) It is never necessary to remove any emanations resulting from cutting tobacco from the cutting elements or the machine parts adjacent thereto. (The deposits on the cutter and adjacent machine parts, resulting from cutting by current methods, are very tenacious. No facile manner of removing them has been found as a result of experience and experiment extending back more than fifty years. They resist such solvents as are generally employed in industry which may be safely used. When all else fails, resort to a cold chisel is frequently necessary.)

Another feature of the invention is a machine incorporating a stress plane cutter for dividing a particle which prevents the particle from being subjected to more than one severance.

Another feature of the invention is a detrainer of particles entrained in the boundary layer of a stress plane cutter.

Another feature of the invention is an arrangement for subjecting a particle of material to repeated cutting by a stress plane cutter to subdivide the particle finely.

Before proceeding with the detailed description of the invention, it should be mentioned that there are a number of important advantages derivable from shredding tobacco in the machine of the present invention which will be paralleled in the division of other materials by the present machine in the forms described herein, or modified as necessary to meet requirements in other industries.

As is well known, the preparation of tobacco for use in cigarettes, for instance, as presently carried on in the industry, is expensive and time consuming. It also requires a relatively large amount of space, both for the performance of the operations per set, and for storage of the tobacco between steps in carrying out the operational sequence. Between certain of the steps which are presently followed, it is necessary to store the tobacco in large hogsheads, for instance, which requires considerable space. The elimination of four of the steps currently followed in the preparation of tobacco for cigarettes will obviously eliminate the space requirements incident to these four operations.

In order to prepare the tobacco for cutting, it is required that the moisture content first be brought to about 18%. It is then compressed into a solid cake. It is then cut into thin slices to obtain tobacco which can be used in cigarettes. The added moisture prevents crumbling and affords long shreds which are desirable in cigarette manufacture. However, the added moisture causes matting. The matted tobacco is separated into shreds by the subsequent tumbling process. Heat is added during tumbling to reduce the moisture content. In the most widely used process currently followed in the manufacture of cigarettes, the tobacco is first treated so that it has a moisture content of about 18% before it is compressed into a cake. After the shredding and drying operations, the tobacco will have a moisture content of about 11% to 12%, which is preferred for cigarette tobacco.

It is considered that the machine and method of this invention will render the current procedure of cigarette manufacture obsolete. It will eliminate the moisture control operation prior to compressing into a cake. It will eliminate the compressing operation to form a tobacco cake. After shredding, it will eliminate the steps of separating the matted tobacco resulting from the shredding process. And finally, it will eliminate the partial drying necessary to complete the separation of the tobacco and to adjust the moisture so that it is suitable for use in a cigarette.

It should be understood that these four operations, which it is believed will henceforth be eliminated, constitute a large portion of the total operations in cigarette manufacturing as presently carried out. It should be understood further that the space requirements concomitant with the four eliminated operations represent a considerable part of the total space required for the manufacture of cigarettes.

Other objects and advantages of the invention, as well as the features of construction, combination and arrangement of the parts thereof will be more fully understood from the following description and preferred embodiments taken in conjunction with the accompanying drawings in which:

FIGURE 1 is a schematic side elevation with parts broken away and in section illustrating a cigarette machine employing applicant's bank of cutters;

FIGURE 2 is an enlarged side longitudinal section illustrating a modified double bank of cutting means 24 shown in FIGURE 1;

FIGURE 3 is a schematic side elevation with parts in section of another modified form of the invention employing a closed system and a single bank of cutters;

FIG. 4 is an enlarged end view of a pair of multiple rotors of FIG. 2 showing, by way of example, fourteen cutters on the upper rotor and fifteen on the lower, with the interdigitating of the cutters exaggerated for purposes of illustration;

FIGURE 5 is an enlarged longitudinal sectional view of a double bank of modified cutters showing air passages arranged near the intake area of the cutters;

FIGURE 6 is an enlarged fragmentary section taken on line 6—6 of FIGURE 5;

FIGURE 7 is a vertical elevation, partly in section, showing a stress plane cutter suitable for reduction of materials to powders;

FIGURE 8 is a vertical elevation partly in section showing a second embodiment of the machine of FIGURE 7;

FIGURE 9 is a vertical section, partly in section, showing a third embodiment of the machine of FIGURE 7.

A first embodiment of my invention, shown in FIG. 1, is illustrated in a machine suitable for shredding tobacco for use in the manufacture of cigarettes.

In FIGURE 1, a feed hopper 2 is supplied manually or mechanically with stemmed leaf tobacco pieces. A vibrating bottom 4 discharges the tobacco in a uniform stream from hopper 2 into intake 6 which is connected to conveyor pipe 8. A stream of air created by fan 10 sucks the tobacco through pipe 8. A damper 12 serves as a volume control. Pipe 8 connects to bent duct 14 which in turn connects to the expanded extension duct 16.

When the tobacco conveyed by the air stream in duct 8 enters the bend 14, it separates from the air stream. The heavier tobacco is diverted toward the outside, and the air stream toward the inside. In the expanded extension duct 16, the separation becomes more pronounced and, due to the gradual loss of momentum of the tobacco, the density of the tobacco layer becomes more uniform.

Before the layer of tobacco enters orifice 18, it is engaged by a pick roller 20 which reduces the layer to a desired thickness and diverts the removed excess back into the air stream, which transports it through conveyor pipe 22. After the now uniform layer passes through orifice 18, it is subjected to a cutting action by the stress plane cutter 24 which cuts the leaf tobacco pieces into strands. Depending upon the material, the use to which it is to be put, and consequently the amount of division required, the stress plane cutter 24 may be a single gang cutter comprising as many unit cutters as required. As many as fifty unit cutters formed by cutting grooves in a single cylinder integral with a single rotatable shaft have been employed to advantage in one machine for shredding tobacco for cigarettes. Alternatively the cutting elements may be a pair of such gang cutters integrally mounted on a pair of hubs. These stress plane cutters are preferably arranged so that the discs on one hub intermesh with the discs on the other. In this case the individual cutting elements may be spaced one from another so that their peripheries overlap slightly, say two or three mils, and the discs on one hub are spaced laterally from the discs on the other hub by a distance of two or three mils also.

For use in the severing of tobacco pieces into strands or shreds suitable for use in cigarettes, a single gang stress plane cutter, such as one of the pair shown in FIG. 4, may be incorporated in the cigarette machine of FIGS. 1 or 3 when the cutting element is enclosed in a housing. When a housing is used, a particular type of control mechanism to prevent fine subdivision of the tobacco is incorporated in the machine of FIGURE 1. If, however, a finely divided tobacco with particles of the size such as is used in snuff, for instance, is desired, or if finely divided particles which may be used in reconstituted tobacco are desired for use in tobacco web, or in cigars formed of compacted tobacco particles by extrusion, or other means, the material may be subjected to continuous severing in stress plane cutters. Each of these arrangements requires its own individual set of controls in the machine. These will be explained in detail hereinafter.

To return to the specific consideration of FIGURE 1, it will be understood that pick roller 20 is employed only when it is necessary to achieve completely uniform density of the tobacco in the finished cigarettes. Cigarettes of uniform density can also be produced without using a pick roller by feeding the tobacco uniformly by other means.

The entire stream of now severed tobacco is discharged through orifice 26 onto cigarette paper 28 which overlies a conventional conveyor belt. The belt may be similar to conveyor belt 30 shown in FIGURE 3. The conveyor belt and cigarette paper 28 may be arranged to travel at substantially the same speed as the shredded discharge from orifice 26, or faster, or slower, as desired to control the density of the packing as desired. The cigarette paper is then wrapped around the shredded tobacco, and sealed, as it travels through the rod forming section 32.

Cutoff 34 severs the rod into individual cigarettes which are collected on a conventional collecting belt 36. The conveyor pipe 22 with the removed excess tobacco terminates in a discharge apparatus 38 which separates the excess tobacco from the air stream and discharges it through a suitable air gate 39. The air gate 39 directs it back into feed hopper 2. A pipe 40 connects the discharge apparatus 38 to the fan 10, which directs the air through the outlet duct containing the damper 12.

It should be obvious that if the cigarette forming, sealing and severing units are omitted, the machines shown in FIGS. 1 and 3 may be readily adapted for flaking, shredding or comminuting vegetables, minerals, fabrics, plastics, metals, adhesive bearing materials and other materials. In fact, it has been found that when a housing element is employed with a single gang cutter alone and is equipped with means for subjecting the severed material to continuous cutting for a relatively short interval, a few seconds for instance, the material is pulverized into fine powder. Coffee beans, for instance, have been pulverized in this manner, into a powder suitable for instant use after the addition of a suitable liquid, water or milk, for instance. Obviously it may be used to reduce vegetables per se as well as vegetable and mineral matter, textiles, synthetic materials and any other material which is susceptible to pulverization without limit to whatever degree of fineness is desired. Pulverization by the method of the invention herein is capable of producing particles as fine, or finer, than that produced by any heretofore known method. It has produced particles as fine as those which when borne by a stream of gas is characterized as smoke.

The design and operation of this new cutting means will now be briefly described with respect to FIGS. 2 and 4. As can be readily seen in these figures, the cutting mechanism comprises two parallel shafts 122 and 124 in which are integrally formed multiple discs 126, each disc being spaced from the adjoining discs by separations 128.

The two rotors in which the discs are formed are surrounded by a housing 138 which has an intake channel 132 and an output channel 134. The tobacco flakes which travel into the intake channel 132, in the direction of arrow 130, are cut into strands of desired width according to the spacing of the discs 126. The strands leave the cutting means through output channel 134 as indicated by arrow 136.

Preferably, the cutting means are arranged so that the discs 126 on rotor 122 are opposite the separations 128 between the discs 126 on shaft 124, as shown in FIGURE 4 so that the discs intermesh for a distance of two or three mils. This intermeshing is exaggerated as shown in FIGURE 4 for visual emphasis to facilitate this description. As a result of the intermeshing, it is considered that the boundary layer of air or gas under pressure created by the discs on one shaft will in effect support the material being subjected to stress plane cutting by the opposite set of discs.

Attention is again called to the fact that in FIGS. 1 and 3, only one multiple cutter is employed, and it rotates in close proximity with a stationary counter-face. Under this condition the space separating the discs from the opposed fixed counter-face should be only a few mils. The principle of operation of the single gang cutter and the two opposed gang cutters so far as is known is the same. With either arrangement, when division results from a single traverse past the cutting position, long tobacco strands have been produced. Long strands are desirable for use in the manufacture of cigarettes since they are conducive to greater uniformity in the density of the tobacco in the cigarettes.

It has been found that edge velocities of the cutting element of 300 feet per second will provide satisfactory stress plane cutting of tobacco. Further it has been found that there is a critical velocity at some speed between 300 feet per second and 600 feet per second, above which critical velocity the accumulation of deposits on the cutting blades, resulting from the cutting, is prevented.

It has been found that cutters which employ the principle of stress plane cutting do not require resharpening. Further it has been found that such cutters do not need to be equipped with devices to prevent deposits on the cutters of emanations resulting from cutting tobacco as well as other materials when cutters are operated at edge speeds above a critical value somewhere between 300 feet per second and 600 per second. It should be understood also that the cutting element may be manufactured out of a wide range of materials and may take a considerable number of different forms. The cutting element, therefore, need not be limited to material, such as steel, and forms, such as discs and knives, heretofore widely employed.

Refer now to FIG. 3 which shows another embodiment of the invention. This embodiment may be used to advantage when the tobacco is stored on a floor above the cigarette manufacturing machinery, for instance. In the arrangement of FIG. 3, a supply of tobacco 80 is delivered by a slowly moving belt, for instance, to a pick roller 82. The pick roller 82 picks the tobacco 80 from the belt and showers it through an intake shute 84 into a conveyor duct 86. Air under pressure is supplied through duct 86 transporting the tobacco to a downwardly bent duct 14 which opens into an expanded extension 16. The bent duct 14 and the expanded extension 16 operate on the tobacco and on the air in a manner which should be understood from the foregoing description of FIG. 1. The apparatus is provided with a pick roller at the entrance to the channel giving access to the single gang cutting rotor 24. This delivers the tobacco in a layer of uniform thickness to the cutter. The cutter severs the tobacco into relatively long shreds. In the arrangement described, the bulk of the tobacco makes but a single pass through the cutter and is subjected to but one severing.

At the output of the cutter, the stranded tobacco is directed onto a band of cigarette paper which overlies continuous belt 30 driven by the system of rollers shown. The paper and the tobacco pass through a rod-forming section in which they are formed into a cylindrical shaft and sealed. They are thereafter delivered to the cutter 34 which separates them into suitable cigarette lengths.

While the process described uses means to change a stream of tobacco of a nonuniform density created by nonuniform feeding into a stream of tobacco of uniform density by accumulating an excess and then removing the surplus, in the present invention it is possible to utilize a feeder which supplies a uniform stream of tobacco which can be fed without adjustment directly into the cutting means. With this arrangement, no overflow return, such as conduit 22 and its associated mechanism, would be required.

As stated in the foregoing, the rotors such as 122 or 124 may have as many as fifty or more discs such as 126 thereon. It is contemplated that such a rotor might be employed in a machine for shredding tobacco which is formed into a single cigarette rod. The invention contemplates also rotors having several hundred discs such as 126 formed therein, the output from which would be directed into a plurality of individual streams to form a plurality of cigarette rods at one time.

As mentioned in the foregoing, in shredding tobacco heretofore, the moisture content of the tobacco had to be adjusted so that the percentage of moisture in the tobacco, when formed into a cake, which was employed in shredding, was about 18%. After the shredding of the cake, the severed tobacco adhered in the form of slices. In order to condition the tobacco in this form for use in cigarettes, it was necessary to perform two additional operations, namely to separate the tobacco slices, and to partially dry the tobacco in order to obtain the bulk of the tobacco in the form of individual strands having a moisture content of 11% to 12% which is the desired moisture content in tobacco for making cigarettes. None of these operations is necessary when the present invention is used to prepare tobacco for cigarettes. It is not necessary to moisturize the tobacco so that it will not break when compacted into a cake. It is not necessary to form the tobacco into a cake before shredding. It is not necessary to separate slices produced as a result of cutting the tobacco cake. It is not necessary to partially dry separated slices so as to produce individual strands. Equally important, and as should be obvious from the foregoing, since four operational steps are eliminated, the storing of the tobacco incident to the performance of these four operational steps, which is a major factor in the space requirements in a cigarette factory, is eliminated. It is stressed that the size of a cigarette factory required for the production of a given quantity of cigarettes per unit time will be greatly reduced by the present invention. This will obviously effect a major saving in the initial costs, annual maintenance, taxes and other incidental expenses.

It should be apparent from the foregoing also that the present invention provides a cutting operation in a production process in which the cutter may comprise a single rotor having a large number of peripheral cutting projections encircling the rotor, which projections may be in the form of discs or shaped somewhat irregularly as in FIG. 6. Alternatively the cutter may be a plurality of such rotors disposed as explained. In either arrangement, the discs or the irregular projections encircling the rotor do not actually touch the material while the cutting operation is being performed. Attention is also directed to the fact that the cutting element need not necessarily be a high speed rotor having discs or peripheral projections thereon.

In FIGS. 5 and 6, a modified high speed cutting device is shown, comprising solid cylindrical cutting means 200 and 202 having peripheral ridges 201 formed therein.

The ridges are preferably interdigitated radially slightly, so that each ridge on one of the rotors projects into the space separating ridges on the other of the rotors for about two thousandths or three thousandths of an inch, for instance. The radial projection of the ridges, as shown in FIG. 6, is exaggerated to make it apparent to the eye. The cutting devices 200 and 202 are enclosed in a housing 204. The rotors 200 and 202 rotate as shown by the arrows 206 and 208 respectively. The material which is to be divided is supplied through pipe or duct 210 in the direction of arrow 212. Rotors 200 and 202 are rotated at sufficient speed to produce stress planes in the material which is severed and to prevent deposit of emanations caused by cutting. After the material passes through space 214, it is divided as a result of the high pressure and the stress plane created thereby. The severed product is discharged in the direction of arrow 216 in pipe or duct 218.

It has been found that when material is to be shredded in a single pass through such a structure as is shown in FIG. 5, it is desirable to provide additional ducts such as 220 and 222 to reduce turbulence in space 214 where the material is projected toward the cutters 200 and 202. The airborne material is light and its motion is adversely effected by turbulence in this space. Suction means, not shown, are connected to ducts 220 and 222 which supplies the current of air in the pipe or duct 210 which transports the material toward the cutting elements. Most of the air going through pipe or duct 210 passes through ducts 220 and 222. By properly regulating the rate of operation of the suction means connected to ducts 220 and 222, it is possible to practically eliminate all turbulence which would otherwise be produced in space 214. Attention is called to the fact that in the arrangement shown in FIG. 5, the pipe or duct 210 terminates almost at the cutting means 200 and 202. The tobacco is in the form of cut leaf, and when borne on the air stream, the bulk of its assumes a substantially horizontal position. Relatively small gaps 224 and 226 separate pipe or duct 210 from rotor 200 and rotor 202 respectively. Practically all of the air which is drawn through pipe or duct 210 passes through gaps 224 and 226 into ducts 220 and 222. The tobacco, however, due to its momentum, is projected through space 214 and into engagement with rotors 200 and 202 without substantial diminution of speed and since there is little or no turbulence, the bulk of it remains in the desired horizontal position which facilitates shredding. In the operation of FIG. 5, the rotation of rotors 200 and 202 produces a layer, or layers, of air under pressure therebetween, which, in turn, produces stress planes which sever the material. Attention is called to the projections 244 and 246 in the housing 204. These projections engage the rotors 200 and 202 very closely leaving only small gaps 228 and 230 between the housing 204 and the rotors 200 and 202. It is considered that the rotors 200 and 202 operate somewhat as a gear pump and direct certain amounts of air through the gaps 228 and 230. This air is evacuated through ducts 220 and 222 so that it has little or no effect in the space 214.

It has been found desirable to provide a pipe or duct 218, through which the divided material is ejected, which is of larger cross-section than input duct 210. Further the duct 218 has a considerably enlarged expansion area 242 near its connection to housing 204. This expansion area 242 serves as a dampening and cushioning space when the cut tobacco is projected into duct 218 at a very high velocity due to the speed of rotation of rotors 200 and 202.

Whereas in shredding material, such as tobacco, it is desirable that the material make but a single pass through the cutters, and the mechanisms in FIGS. 1 and 3 are arranged to this end, in order to divide it further, or to pulverize it, it is necessary that the material be subjected to many cuttings and the apparatus must be arranged so that the material is not ejected after a single pass, but is constrained in engagement with the multiple stress plane cutters for the period necessary to reduce it to the required fineness. Due to the high speed of the rotor, or rotors, this interval is surprisingly short relative to the time ordinarily required for such division. At the speed of operation necessary to produce a stress plane and to prevent any deposit on the cutting elements per se, the material particles may be divided several thousand times in four or five seconds, for instance.

Turbulence is not a problem in a machine arranged to divide material finely. All that is required is an arrangement which confines the material in proper relation to the circular peripheral projections on the rotor or rotors so as to prevent its escape until the required fineness is attained. Such a machine may take many forms, and the mechanism for conveying the material to the cutters may also be of any of a number of kinds.

I have found that by blocking the normal means of egress provided in FIG. 5, I was able to reduce coffee beans to a fine powder in a few seconds. The powder was ejected through ducts 220 and 222. A simple modification of FIG. 5, more suitable for pulverization, is shown in FIG. 7. This machine also employs two rotors, 300, 302, each having a large number of circular peripheral projections, such as fifty to two hundred, or more, such as are shown in FIGS. 4 or 6. The two rotors are closely confined in a housing 304 having an inlet 306. The normal right-hand outlet for the material corresponding to that in FIG. 5, is not provided, so the material is not ejected immediately after a single short pass through the cutters, but is subjected to many divisions, in a few seconds, while it traverses the circular spaces between the peripheries of the rotors and the interior surface of the casing through the major portion of the boundary space therebetween. The rotors are rotated at speeds sufficiently high to pulverize the material by stress plane cutting. This speed, as mentioned, varies for different materials. The powder to which the material is reduced in a few seconds is drawn off through ducts 320 and 322 by suction.

In the arrangement shown in FIG. 8, a single rotor 350 having a plurality of integral circular peripheral projections, as in FIGS. 4 or 6, is employed. The rotor is driven at high speed to effect cutting by means of a stress plane and to prevent deposits of the emanations due to cutting on the projections. In order to confine the material so that it may be reduced to powder, the rotor is provided with a closely fitting housing 354. The material to be pulverized is supplied through a hopper 352. The pulverized material is ejected into a container 356. The machine is provided with a slidable input closure 358 and a slidable output closure 360, each of which may be manually operated or machine operated through linkages, not shown, in proper timed relation with the material supply, to provide the desired fineness of division of the material.

The machine of FIG. 9 is generally the same as that of FIG. 8 except that material is supplied to its input by means of an endless belt 370.

What is claimed is:

1. An apparatus for pulverizing material comprising a stress plane cutter, said cutter comprising a rotor, said rotor having a cylindrical surface and a plurality of continuous ring projections on said surface, said projections spaced one from another in a direction parallel to the axis of rotation of said rotor, a housing having a smooth substantially cylindrical inner surface closely confining said cutter, said cutter in said housing constructed, arranged and actuated at a speed to subject the material to continuous division until it is reduced to a relatively dry powder.

2. An apparatus for pulverizing material having a stress plane cutter comprising a rotor having a cylindrical surface and a plurality of integral continuous ring projections spaced one from another along said surface in a direction transverse its rotational axis, a housing having a substantially cylindrical smooth inner surface, said cutter closely confined in said housing and means for rotating said cutter at a sufficiently high speed to sever said material by stress plane cutting to reduce it to a relatively dry powder.

3. An apparatus for reducing a material to a fine substantially dry powder comprising a high speed rotor having a cylindrical surface, said surface having multiple disc like projections formed therein, said projections spaced one from another along said cylindrical surface in a direction parallel to the rotational axis of said rotor, means for rotating said projections at a linear speed of from 300 to 600 feet per second, a housing having a substantially cylindrical smooth inner surface, said rotor so disposed in said housing that said housing closely confines said projections, means of ingress to said projections in said housing, means of egress from said projections in said housing, a first closure for said means of ingress, a second closure for said means of egress, said housing, said first means and said second means coacting to constrain said material in engagement with said projection until said material is reduced to a fine substantially dry powder through stress plane division.

4. An apparatus for shredding tobacco comprising a pair of rotors each having multiple circular projections on its circular periphery transverse the axis of rotation of its respective rotor, said projections spaced one from another in a direction parallel to its respective axis, the axes of said rotors disposed in parallel and spaced so that said projections on each are disposed very close to the projections on the other, and a bight is formed between said rotors for receiving said tobacco, means for rotating said projections at sufficiently high speed to shred said tobacco by stress plane cutting, and means for directing said tobacco toward said bight so that the bulk of it makes only a single pass between said projections, so as to tend to produce a maximum of long tobacco shreds.

5. An improved pulverizing apparatus comprising a housing closely confining a rotary member having a plurality of continuous annular peripheral ridges integrally formed thereon, said ridges spaced one from another in a direction parallel to the axis of rotation of said rotor and adapted for rotation at a speed ranging from 300 to 600 feet per second, so as to divide material fed past said ridges without actual contact between said material and said ridges, means for feeding material past said ridges to divide said material and means for constraining said material adjacent said ridges until said material is pulverized.

6. A cutter for shredding material by stress plane cutting comprising a pair of closely spaced rotors having their axes of rotation disposed in parallel, each said rotor having a plurality of ridges formed therein, means for rotating said ridges at a linear speed ranging from 300 to 600 feet per second to effect cutting of material by the effect of pressure between said ridges and said material as a result of the high speed of rotation of said ridges without actual contact between said ridges and said material, said ridges being spaced one from another a distance corresponding to the width of the shreds desired, and means for directing said material to said ridges along a predetermined path to promote optimum shredding of said material.

7. A stress plane cutter comprising two rotors disposed with their axes of rotation parallel, a plurality of peripheral circular ridges formed in each of said rotors, said ridges spaced transversely of the axis of rotation of its respective rotor, the ridges of one of said rotors interdigitating with the other, and means for rotating said ridges at a linear speed ranging from 300 to 600 feet per second.

8. An apparatus for stress plane pulverizing of materials comprising means for propelling said materials along a duct at high velocity by air, high velocity cutters in the path of said material, said cutters comprising a pair of rotors, each of said rotors having a plurality of cutting ridges on its periphery, said cutting ridges on each rotor being closely spaced from the cutting ridges on the other rotor, so as to coact therewith in severing said material by stress plane cutting, and means for rotating said ridges at a speed ranging between 300 and 600 linear feet per second, to sever said material as a result of the effect of boundary layers of gas at high pressure between said ridges and said material without actual contact between said ridges and said material.

9. An apparatus for pulverizing material, said apparatus comprising a rotor, a plurality of cutting elements transverse the axis of rotation of said rotor, and spaced in a direction parallel to said axis, projecting from the cylindrical surface of said rotor, means for rotating said elements at a linear speed ranging from 300 to 600 feet per second, a housing closely confining said elements, and means for introducing material to be comminuted between said cutting elements and said housing.

10. An apparatus for pulverizing material, said apparatus comprising a rotor, a plurality of cutting elements transverse the axis of rotation of said rotor, and spaced in a direction parallel to said axis, projecting from the cylindrical surface of said rotor, means for rotating said elements at a linear speed in excess of 550 feet per second, a housing closely confining said elements, and means for introducing material to be comminuted between said cutting elements and said housing.

11. An apparatus, for comminuting vegetable materials, said apparatus comprising cutting means, a housing closely confining said cutting means, said cutting means comprising a rotor, a plurality of spaced parallel cutting elements projecting from the cylindrical surface of said rotor, and means for rotating said cutting elements at a linear speed greater than 550 feet per second, to prevent the depositing of emanations from said material on said cutting elements.

12. A cigarette tobacco shredding machine arranged to eliminate a number of necessary operations currently performed in the preparation of tobacco for cigarettes, including the steps of raising the moisture content of the tobacco to between 16% and 18% prior to compaction and shredding, and reducing the moisture content thereafter to between 10% and 12%, to improve the tobacco by minimizing fragmentation incident to the eliminated operations, said machine having an ultra high speed tobacco cutting mechanism, said mechanism having a pair of rotors, each of said rotors having a succession of turns of cutting elements projecting from its cylindrical surface, said elements on one of said rotors closely spaced with respect to the elements on the other of said rotors, so as to coact therewith in the stress plane cutting of said tobacco, means for rotating said elements at a linear speed of 300 to 600 linear feet per second, and a conveyor for feeding a stream of tobacco having a moisture content between 10% and 12% so that the tobacco stream engages said cutting elements in a direction substantially parallel to the direction of motion of said cutting elements, so as to be reduced to shreds in a single passage between said coacting elements.

13. A machine in accordance with claim 12 in which said cutting elements comprise a plurality of annular projections spaced along the cylindrical surface of said rotors, transverse the axis of rotation of said rotors.

References Cited by the Examiner
UNITED STATES PATENTS

| | | | |
|---|---|---|---|
| 461,789 | 10/1891 | Winchell | 241—222 |
| 979,063 | 12/1910 | Edwards | 146—121 |
| 1,991,757 | 2/1935 | Lorentz | 146—117 |
| 2,225,797 | 12/1940 | Plauson. | |
| 2,292,901 | 8/1942 | Schmitz | 146—122 X |

OTHER REFERENCES

Materials and Methods (pub.) "Supersonic Wind Used For Fine Slicing of Materials," issue of June 1952, volume 35, No. 6, page 13.

Industrial and Engineering Chemistry (pub.) "Technical and Commercial Developments," volume 45, No. 3, March 1953, pages 11A, 13A.

ROBERT C. RIORDON, *Primary Examiner.*

CARL W. ROBINSON, *Examiner.*